US007506428B2

(12) United States Patent
Bedell et al.

(10) Patent No.: US 7,506,428 B2
(45) Date of Patent: Mar. 24, 2009

(54) ION MILL PROCESS WITH SACRIFICIAL MASK LAYER TO FABRICATE POLE TIP FOR PERPENDICULAR RECORDING

(75) Inventors: Daniel Wayne Bedell, San Jose, CA (US); Tom King Harris, III, Morgan Hill, CA (US); Gautam Khera, Morgan Hill, CA (US); Quang Le, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 810 days.

(21) Appl. No.: 10/676,728

(22) Filed: Sep. 30, 2003

(65) Prior Publication Data

US 2005/0066517 A1 Mar. 31, 2005

(51) Int. Cl.
*G11B 5/187* (2006.01)
(52) U.S. Cl. .............. 29/603.12; 29/603.13; 29/603.23; 204/192.34; 360/122
(58) Field of Classification Search .............. 29/603.07, 29/603.12, 603.13, 603.14, 603.15, 603.16, 29/603.18, 603.23, 603.25; 204/192.34; 216/2; 360/122, 123, 125, 126, 324.12, 115, 360/118
See application file for complete search history.

(56) References Cited

U.S. PATENT DOCUMENTS

| | | | | |
|---|---|---|---|---|
| 4,141,052 A | * | 2/1979 | Hanaoka | 360/118 |
| 5,075,956 A | | 12/1991 | Das | 29/603 |
| 5,103,553 A | * | 4/1992 | Mallary | 29/603.13 |
| 5,141,623 A | * | 8/1992 | Cohen et al. | 204/192.34 X |
| 5,853,960 A | * | 12/1998 | Tran et al. | 216/2 X |
| 6,034,847 A | * | 3/2000 | Komuro et al. | 360/126 |
| 6,038,110 A | * | 3/2000 | Aboaf et al. | 29/603.14 X |
| 6,172,848 B1 | | 1/2001 | Santini | 360/126 |
| 6,198,597 B1 | | 3/2001 | Tateyama et al. | 360/126 |
| 6,278,591 B1 | * | 8/2001 | Chang et al. | 360/126 X |
| 6,305,072 B1 | | 10/2001 | Yoda et al. | 29/603.14 |
| 6,469,875 B1 | * | 10/2002 | Chen et al. | 29/603.16 X |
| 6,779,249 B2 | * | 8/2004 | Santini | 29/603.15 X |
| 2002/0053130 A1 | | 5/2002 | Sasaki | 29/603.15 |
| 2002/0078553 A1 | | 6/2002 | Sato | 29/603.15 |
| 2002/0157238 A1 | | 10/2002 | Shimazawa et al. | 29/603.18 |
| 2004/0052009 A1 | * | 3/2004 | Ohtsu et al. | 360/324.12 |

FOREIGN PATENT DOCUMENTS

JP 10241121 9/1998

OTHER PUBLICATIONS

Gorman et al., "Recording Studies of Sub-Micron Write Heads by Focused Ion Beam Trimming", IEEE Transactions on Magnetics, vol. 33, No. 5, Sep. 1997, pp. 2824-2826.*

* cited by examiner

*Primary Examiner*—A. Dexter Tugbang
(74) *Attorney, Agent, or Firm*—Patent Law Office of Larry Guernsey; Larry B. Guernsey

(57) ABSTRACT

A method of fabrication of the write head of a perpendicular recording head allows for production of P3 pole tips of width less than 200 nm ($200 \times 10^{-9}$ meters). The method includes fabricating the P2 flux shaping layer, depositing the P3 layer, depositing a layer of ion-milling resistant material, depositing at least one sacrificial layer, shaping the P3 layer into P3 pole tip, removing the at least one sacrificial layer to leave the P3 pole tip, and encapsulating the P3 pole tip.

14 Claims, 3 Drawing Sheets

ION MILL PROCESS WITH SACRIFICIAL MASK LAYER TO FABRICATE POLE TIP FOR PERPENDICULAR RECORDING

BACKGROUND OF THE INVENTION

1. Field of the Invention

The present invention relates to heads for high track density perpendicular magnetic recording, and more particularly relates to fabrication of poles of such heads.

2. Description of the Prior Art

Data has been conventionally stored in a thin media layer adjacent to the surface of a hard drive disk in a longitudinal mode, i.e., with the magnetic field of bits of stored information oriented generally along the direction of a circular data track, either in the same or opposite direction as that with which the disk moves relative to the transducer.

More recently, perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the write pole. In this type of disk drive, the magnetic field of bits of stored information are oriented normally to the plane of the thin film of media, and thus perpendicular to the direction of a circular data track, hence the name.

Media used for perpendicular recording typically include a hard magnetic recording layer and a soft magnetic underlayer which provide a flux path from the trailing write pole to the leading opposing pole of the writer. Current is passed through the coil to create magnetic flux within the write pole. The magnetic flux passes from the write pole tip, through the hard magnetic recording track, into the soft underlayer, and across to the opposing pole, completing a loop of flux.

Perpendicular recording designs have the potential to support much higher linear densities than conventional longitudinal designs. Magnetization transitions on the bilayer recording disk are recorded by a trailing edge of the trailing pole and reproduce the shape of the trailing pole projection on the media plane, thus the size and shape of the pole tip is of crucial importance in determining the density of data that can be stored.

Perpendicular magnetic recording is expected to supersede longitudinal magnetic recording due to the ultra-high density magnetic recording that it enables. Increases in areal density have correspondingly required devising fabrication methods to substantially reduces the width of the P3 write pole tip 52 while maintaining track-width control (TWC) and preserving trailing edge structural definition (TED). As mentioned above, the writing process reproduces the shape of the P3 write pole projection on the media plane, so the size of the P3 limits the size of the data fields and thus the areal density. The current drive is to make P3 poles of less than 200 nm ($200 \times 10^{-9}$ meters). Making reliable components of such microscopic size has been a challenge to the fabricating process arts. This problem is made even more challenging because the P3 pole shape at the ABS is preferably not a simple rectangle, but is trapezoidal, with parallel top and bottom edges, but a bevel angle preferably of approximately 8 to 15 degrees on the side edges. This is primarily done so that the P3 pole tip fits into the curved concentric tracks without the corners extending into an adjacent track by mistake.

Various approaches have been tried in an effort to shape such tiny components. Ion milling (IM) is a process that has been long used in the manufacture and shaping of such microcomponents, but here there is the difficulty of maintaining the top edge dimension while trying to cut the side bevels. Initially, alumina was used as an IM hard mask for reliable beveled (8-15 degree) track-width definition (TWD) in the 330-300 nm range but was later changed to carbon to further extend the IM process to smaller dimensions. The complication in developing an IM scheme is the inability to consistently achieve a TWC process and preserve TED due to inefficient resistance of the hard mask to passivate TED. Carbon such as diamond-like-carbon (DLC) does offer a higher milling resistance over alumina to preserve TED for the 300-250 nm range of TWD. But there are inherent difficulties in depositing sufficient carbon film thickness to provide adequate TED protection because as the film's thickness increases, stress may result in delamination or wafer bowing. Thus the ability to extend the P3 carbon process to track-width dimension below 200 nm will be increasingly problematic. Moreover, at TWD below 200 nm, the pole piece will be fragile and removal of redeposited materials (milling nonvolatile byproducts) on top and sides of the pole tip will be increasingly more difficult.

Thus, there is a need for a method for fabricating P3 pole tips for track widths less than 200 nm for perpendicular recording.

SUMMARY OF THE INVENTION

A method of fabrication of the write head of a perpendicular recording head allows for production of P3 pole tips of width less than 200 nm ($200 \times 10^{-9}$ meters). The method is practiced by fabricating the P2 flux shaping layer, depositing the P3 layer, depositing a layer of ion-milling resistant material, depositing at least one sacrificial layer (PS), shaping the P3 layer into P3 pole tip, removing the at least one sacrificial layer to leave the P3 pole tip, and encapsulating the P3 pole tip.

It is an advantage of the present invention that the PS layer can be fabricated with a high aspect ratio which offers higher milling resistance and allows for better passivation.

It is another advantage of the present invention that better Trailing Edge structural Definition (TED) than before can be produced.

It is a further advantage of the present invention that improved Track Width Control (TWC) can be achieved. It is an advantage of the present invention sub-micron track widths can be obtained.

It is yet another advantage of the present invention that this process minimizes redepostion of materials.

It is a further advantage of the present invention that this process allows for adaptive track width control.

Yet another advantage of the present invention is that the write pole is preferably encapsulated and that its chances of corrosion or damage are minimized.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
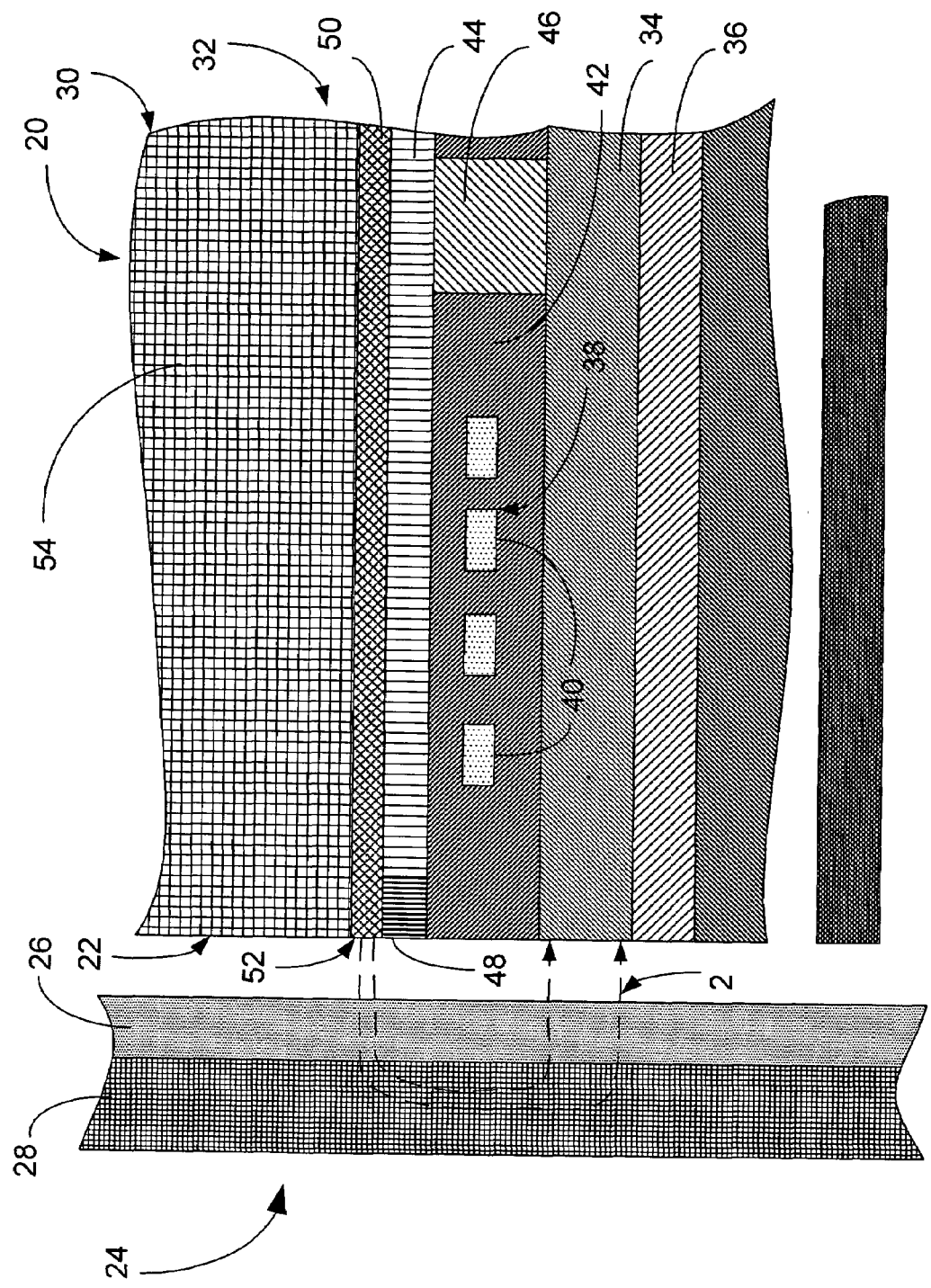
FIG. 1 is a side cross-sectional view depicting various components of the write head of a prior art perpendicular head.

To aid in the understanding of the structures involved in the present invention, the following discussion is included with reference to the prior art illustrated in FIG. 1.

FIG. 1 (prior art) is a side cross-sectional diagram of the write head portion of a typical prior art perpendicular magnetic head. A slider 20 has an air bearing surface (ABS) 22 which flies above the surface of a hard disk 24. The disk 24 includes a high coercivity magnetic layer, also referred to as the hard layer 26 that is fabricated on top of a magnetically soft layer 28.

The perpendicular head 30 typically includes a read head, which is not shown here. The write head portion includes a first magnetic pole P1 34 is fabricated upon an insulation layer 36. An induction coil structure 38, which includes coils 40, is fabricated upon the P1 pole 34. The coil turns 40 are typically formed within electrical insulation layers 42. A second magnetic pole layer, typically termed a P2 shaping layer 44, is fabricated on top of the induction coil structure 38. A magnetic back gap piece 46 joins the back portions of the P1 pole 34 and the P2 shaping layer 44, such that magnetic flux can flow between them. The P2 shaping layer 44 is fabricated so that a gap 48 is left between it and the rest of the ABS 22, and an alumina fill is deposited across the surface of the wafer which results in filling the gap 48 in front of the P2 shaping layer 44. A P3 layer 50, also called a probe layer, includes a P3 pole tip 52, and is in magnetic flux communication with the P2 shaping layer 44. The P2 shaping layer channels and directs the magnetic flux into the P3 pole tip 52.

The magnetic head 30 is subsequently encapsulated, such as with the deposition of an alumina layer 54. Thereafter, the wafer is sliced into rows of magnetic heads, and the ABS surface of the heads is carefully polished and lapped and the discrete magnetic heads are formed.

Electrical current flowing through the induction coil structure 38 will cause magnetic flux 2 to flow through the magnetic poles 34, 52 of the head, where the direction of magnetic flux flow depends upon the direction of the electrical current through the induction coil. In one direction, current will cause magnetic flux 2 to flow through the P2 shaping layer 44 through the P3 layer 50 to the narrow pole tip 54 into the hard layer 24 and soft layer 28 of the hard disk 24. This magnetic flux 2 causes magnetized data bits to be recorded in the high coercivity layer hard layer 24 where the magnetic field of the data bits is perpendicular to the surface of the disk 24. The magnetic flux then flows into the magnetically soft underlayer 28 and disperse as they loop back towards the P1 pole 34. The magnetic flux then flows through the back gap piece 46 to the P2 shaping layer 44, thus completing a magnetic flux circuit. In such perpendicular write heads, it is significant that at the ABS 22, the P1 pole 34 is much larger than the P3 pole tip 52 so that the density of the magnetic flux passing out from the high coercivity magnetic hard layer 26 is greatly reduced as it returns to the P1 pole layer 34 and will not magnetically affect, or flip, the magnetic field of data bits on the hard disk, such as bits on data tracks adjacent to the track being written upon.

Stages in the process of fabrication of a P3 pole tip for a write head for perpendicular recording are shown in FIGS. 2-7. In these figures, it will be assumed that the lower layers such as the first pole P1 34, the induction coil structure 38, and insulation layer 42 (see FIG. 1) have been already formed in a conventional manner.

Figure 2:
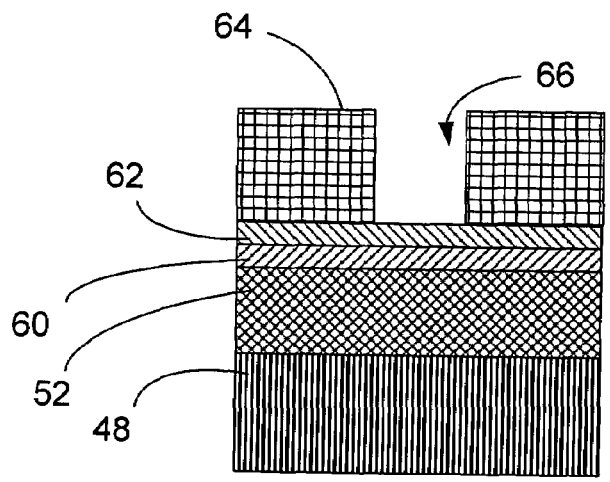
FIG. 2 is a front plan view of the Air Bearing Surface of a write head in a stage of fabrication.

FIGS. 2-7 show the structure as seen from the ABS. In FIG. 2, the P2 shaping layer has been deposited, but is not visible behind the alumina fill layer 48, as the P2 layer does not extend to the ABS, as discussed above. The P3 pole tip 52 layer consists of multi-layers of high magnetic moment ($B_s$) and non-magnetic laminated pole material such as CoFe or CoFeN or NiFe or their alloys and Cr, $Al_2O_3$, Ru, etc., respectively which have been deposited, and then a layer of material which is resistant to ion milling, such as $Al_2O_3$ or $Ta_2O_5$ or $SiO_xN_y$, or their alloys are deposited. Generally, insulation materials may be used also. This thin nonmagnetic layer will function as a CMP stop layer 60 and the "clean-up" layer. This is followed by a non-magnetic film seed layer 62 (Rh preferred). A layer of photo-resist 64 of given thickness is put down, and a cavity 66 is produced which will be filled in the next step.

Figure 3:
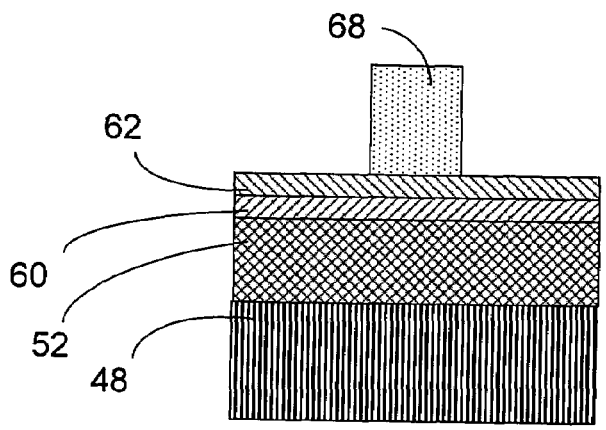
FIG. 3 is a front plan view of the Air Bearing Surface of a write head in another stage of fabrication.

In FIG. 3, the cavity has been filled with material to form a sacrificial layer, also referred to as PS 68. The material of this sacrificial layer is preferably NiP, although other plated materials, (both non-magnetic, and magnetic, as will be discussed later) with high ion milling resistance may also be used. The photo-resist layer is then removed, resulting in the structure seen in FIG. 3. This PS 68 layer is used as an ion mill mask 70 to pattern the P3 layer 52, (to be discussed below). In a preferred process design, the PS 68 and CMP stop layer 60 materials are resistant to ion milling and also have similar ion milling rates, but the CMP stop layer 60 is preferred to have a slightly lower ion mill rate. In this case, when the PS 68 is trimmed to target track-width, the CMP stop layer 60 is also trimmed. The CMP stop layer 60 is used both to bevel the P3 pole tip 52 and as a CMP stop. The role of PS 68 is for patterning the write pole and transferring it to the CMP stop layer 60 and pole tip materials. The material for PS 68 is preferably non-magnetic (also the seed-layer such as Rh) so that traces of it can potentially be left in the head without interfering with the heads' performance. Moreover, it is desirable to plate PS 68 as thick as lithographically possible to achieve higher passivation and ion milling resistance.

Figure 4:
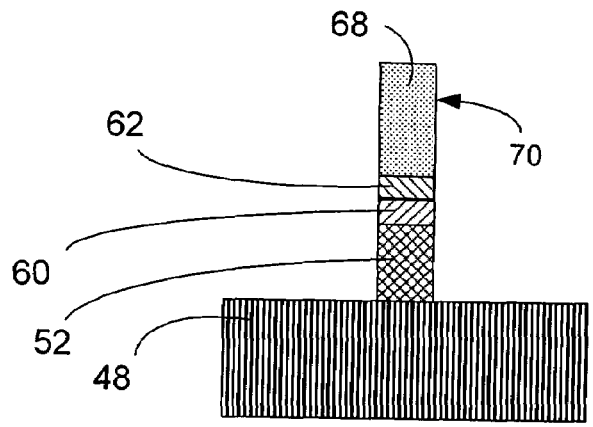
FIG. 4 is a front plan view of the Air Bearing Surface of a write head in yet another stage of fabrication.

In FIG. 4, ion milling is used to cut through the layers 52, 60, 62. The seed-layer 62 is first removed, and then the track-width of PS 68 is preferably reduced before ion milling of CMP stop layer 60 and P3 pole tip 52 is started. By reducing the width of the PS layer 68, the width of the P3 pole tip layer 52, CMP stop layer 60 and seed layer 62 beneath are also reduced.

Figure 5:
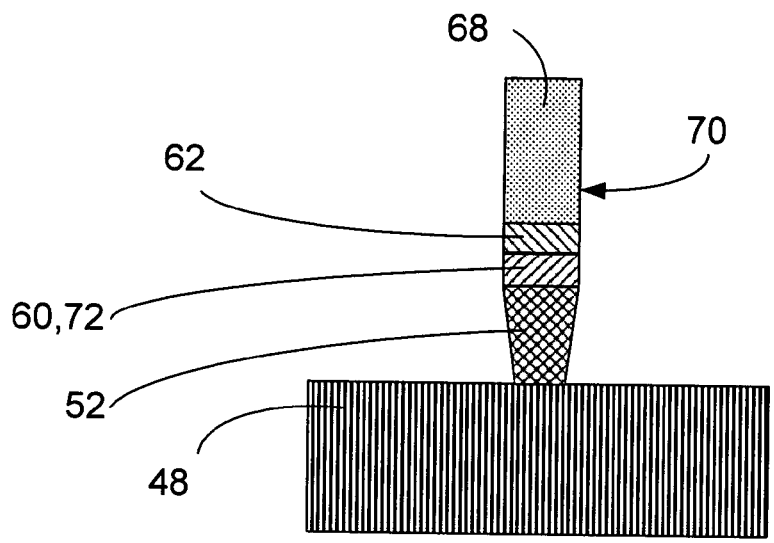
FIG. 5 is a front plan view of the Air Bearing Surface of a write head in another stage of fabrication.
Figure 6:
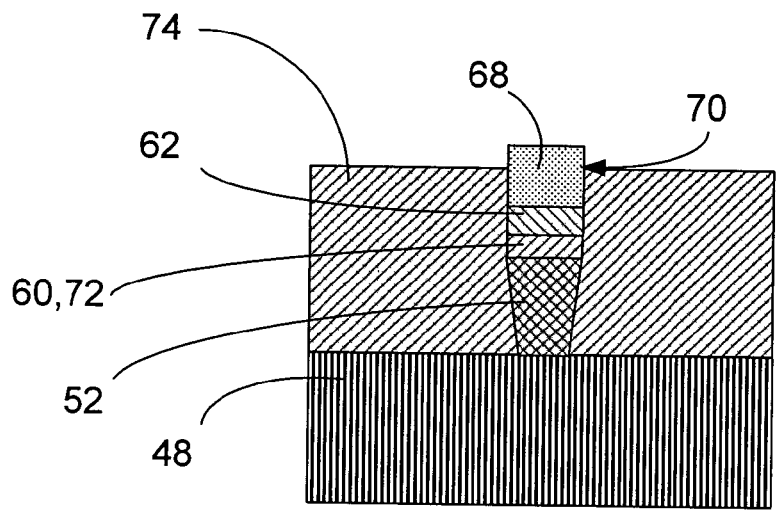
FIG. 6 is a front plan view of the Air Bearing Surface of a write head in yet another stage of fabrication.

Next ion milling is used again to bevel the sides of the P3 pole tip 52, as shown in FIG. 5. The sacrificial layer PS 68 and the seed layer 62 both erode slightly faster during this process, but the CMP stop layer 60, which is preferred slightly higher in ion milling resistance than PS 68 acts as a secondary mask 72 so that the top edge of the P3 pole tip 52 is protected, as shown in FIG. 5. CMP stop layer 60 is also used as a mask to bevel the pole piece.

As the trackwidth of the write pole shrinks, re-deposition and fencing on the side wall of the write pole 52 become a problem for removal since the pole tip 52 is so small (200 nm) and has a higher risk of being damage. In the present invention, after the P3 write pole 52 is defined, it is encapsulated with Al₂O₃ or an insulator material. The encapsulation material provides mechanical strength to the pole and minimizes it from corrosion (CoFe in the pole). As CMP is used to remove PS 68, re-deposition and fencing are removed.

Therefore, after defining the P3 write pole 52 with ion milling, the write pole 52, CMP stop layer 60, remaining seed layer 62 and remaining PS 68 are encapsulated with an insulator such as alumina, which is preferably also of the same material used in the CMP stop layer 60.

CMP is then used to remove the remaining PS 68, and seed layer 62. As discussed above, the encapsulating material is preferred to be similar to CMP stop layer 60, so that as CMP is used to remove PS 68 the removal rate is selective toward PS 68 material. After a while, as CMP encounters the same material, used as the CMP stop layer 60 and encapsulating material 74, the rate slows.

Figure 7:
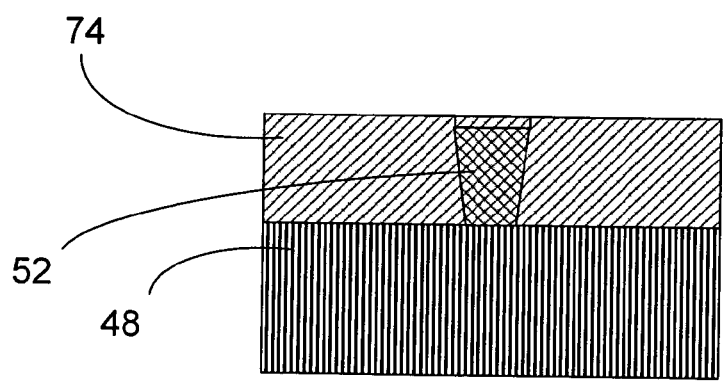
FIG. 7 is a front plan view of the Air Bearing Surface of a write head in a final stage of fabrication.

When the remaining PS layer 68 have been removed, the result is a planarized top surface of CMP stop layer 60 and encapsulating material 74 around the finished P3 pole tip 52, whose width preferably is on the order of 200 nm or less. This structure is shown in FIG. 7.

In the discussion above, it has been preferred that non-magnetic material is used, so that if the CMP does not completely remove the seed layer 62 and PS 68, the performance of the head will not be compromised. However, if in fact the seed layer 62 and PS 68 are completely removed, magnetic material may alternately be used for these layers 62, 68.

Thus, the present invention fabricates a sacrificial plated NiFe layer (PS) above a full-film magnetic layer where P3 will be defined. The higher aspect ratio of the PS layer offers higher milling resistance and allows for better passivation, TED, and TWD than previously disclosed methods.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

THIS CORRESPONDENCE CHART IS FOR EASE OF UNDERSTANDING AND INFORMATIONAL PURPOSES ONLY, AND DOES NOT FORM A PART OF THE FORMAL PATENT APPLICATION.

20 slider
22 ABS
24 disk
26 hard layer
28 soft layer
30 perpendicular head
32 write head
34 first pole P1
36 insulation layer
38 induction coil structure
40 coils
42 insulation layer
44 P2 shaping layer
46 magnetic back gap
48 alumina fill
50 P3 probe layer
52 P3 pole tip
54 alumina layer
60 CMP stop layer
62 seed layer
64 photo-resist
66 cavity
68 PS sacrifical layer
70 IM mask
72 secondary mask
74 encapsulating material layer

What is claimed is:

1. A method for fabricating a write pole tip for perpendicular recording, comprising:
    A) fabricating a P1 write pole, coils and a P2 write pole flux shaping layer;
    B) depositing a P3 write pole layer on said P2 write pole flux shaping layer;
    C) depositing a CMP stop layer on said P3 write pole layer;
    D) depositing at least one sacrificial layer on said CMP stop layer;
    E) shaping said P3 write pole layer into P3 write pole tip;
    F) removing said at least one sacrificial layer to leave said P3 write pole tip; and
    G) encapsulating said P3 write pole tip in a protective layer.

2. The method of claim 1, wherein:
    said P3 write pole layer material of B) is a material chosen from the group consisting of CoFe, CoFeN, NiFe, CoFe alloys, CoFeN alloys, NiFe alloys, Cr, Al₂O₃, and Ru.

3. The method of claim 1, wherein:
    said CMP stop layer material of C) is a material chosen from the group consisting of Al₂O₃, Ta₂O₅, SiO$_x$N$_y$, Al₂O₃ alloys, Ta₂O₅ alloys, SiO$_x$N$_y$ alloys and insulation materials.

4. The method of claim 1, wherein:
    said at least one sacrificial layer of D) comprises a sacrificial layer PS of sacrificial material chosen from the group consisting of NiFe, NiP and plated materials with high ion milling resistances.

5. The method of claim 4, wherein:
    said at least one sacrificial layer of D) further comprises a seed layer of sacrificial material.

6. The method of claim 5, wherein:
    said at least one sacrificial layer is formed by creating a cavity surrounded by photo-resist material, said cavity then being filled with sacrificial material.

7. The method of claim 1, wherein:
    said shaping of said P3 write pole layer of E) is done by ion milling.

8. The method of claim 7, wherein:
    said ion milling is done to first produce a straight-sided structure, as said at least one sacrificial layer masks said P3 write pole tip, and then said CMP stop layer acts as a secondary mask as ion milling is used to bevel the sides of said P3 write pole tip.

9. The method of claim 8, wherein:
    said beveled sides of said P3 write pole tip are beveled to an angle with the range of 8 degrees to 15 degrees.

10. The method of claim 1, wherein:
    said finished P3 write pole tip has a width less than 200 nm.

11. The method of claim 1, wherein:
    said removing of said at least one sacrificial layer of F) further comprises removing said CMP stop layer.

12. The method of claim 11, wherein:
    said removing of said CMP stop layer comprises using Chemical Mechanical Polishing.

13. The method of claim 1, wherein:
    said encapsulating of G) comprises an encapsulating material matching that of said CMP stop layer.

14. The method of claim 1, wherein:
    said at least one sacrificial layer of D) comprises magnetic material; and
    said removing said at least one sacrificial layer of F) requires that all of said magnetic material of said at least one sacrificial layer be completely removed.

* * * * *